C. W. TAYLOR.
BRAKE MECHANISM FOR DIFFERENTIALS.
APPLICATION FILED OCT. 10, 1917. RENEWED SEPT. 25, 1919.

1,324,860.

Patented Dec. 16, 1919.
2 SHEETS—SHEET 1.

Witnesses
Milton Lenoir

Inventor
Clarence W. Taylor

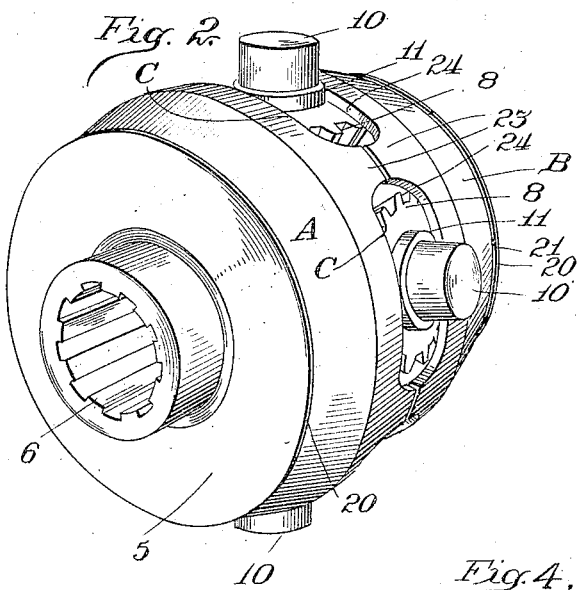
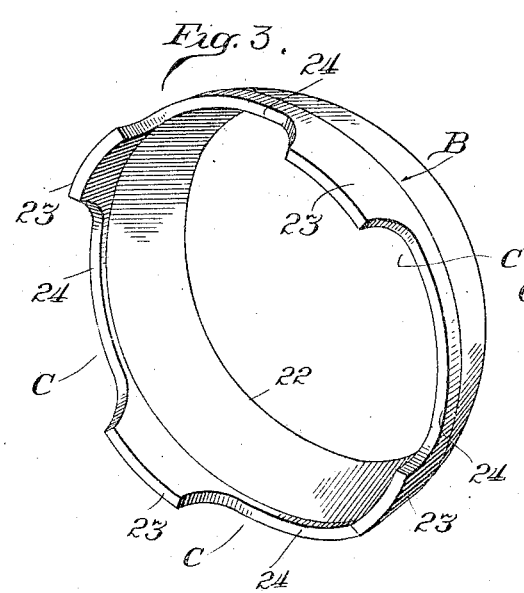
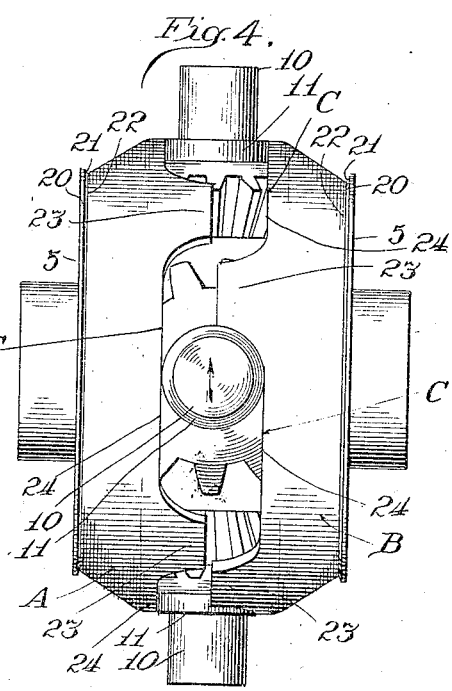

UNITED STATES PATENT OFFICE.

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE MECHANISM FOR DIFFERENTIALS.

1,324,860.     Specification of Letters Patent.     Patented Dec. 16, 1919.

Application filed October 10, 1917, Serial No. 195,671. Renewed September 25, 1919. Serial No. 326,385.

*To all whom it may concern:*

Be it known that I, CLARENCE W. TAYLOR, a citizen of the United States of America, residing at Chicago, in the county of Cook and State of Illinois, have invented certain new and useful Improvements in Brake Mechanism for Differentials, of which the following is a specification.

My invention relates to improvements in differential mechanism, particularly of the bevel type, and the objects of my improvement are:

First, to provide a construction whereby to oppose and prevent "spinning" of either vehicle wheel on a slippery or soft road surface and the well known loss of power, tire injury and other objectionable results;

Second, to improve the bevel gear type of compensating devices by the addition of simple and effective parts which render the rear axle a solid axle on a straight ahead drive and permit differential movement in "turning a corner"; and Third, to afford brake members having relatively large friction contact with the respective driven members on the adjacent ends of the divided shaft and less friction surface in contact with the spider or rotatable housing or driver to facilitate relative rotative movement of said bevel gears.

With the above and other objects in view, my invention consists in the novel features and in the novel combination and arrangement of parts hereinafter fully described, illustrated in the accompanying drawings forming a part of this specification, and particularly pointed out in the claims hereunto appended; it being understood that changes, variations and modifications in the details of the invention within the scope of the claims, may be resorted to without departing from the spirit or sacrificing any of the advantages thereof.

In the drawings,

Fig. 2 is a perspective view of the driven members or bevel gears, pinions and spider with my brake members assembled together, Fig. 3 is a perspective view of one of the brake members, and Fig. 4 is a plan view of the bevel gears, spider and pinions with both brake members assembled together.

Similar numerals and letters refer to similar parts throughout the several views.

Figure 1:
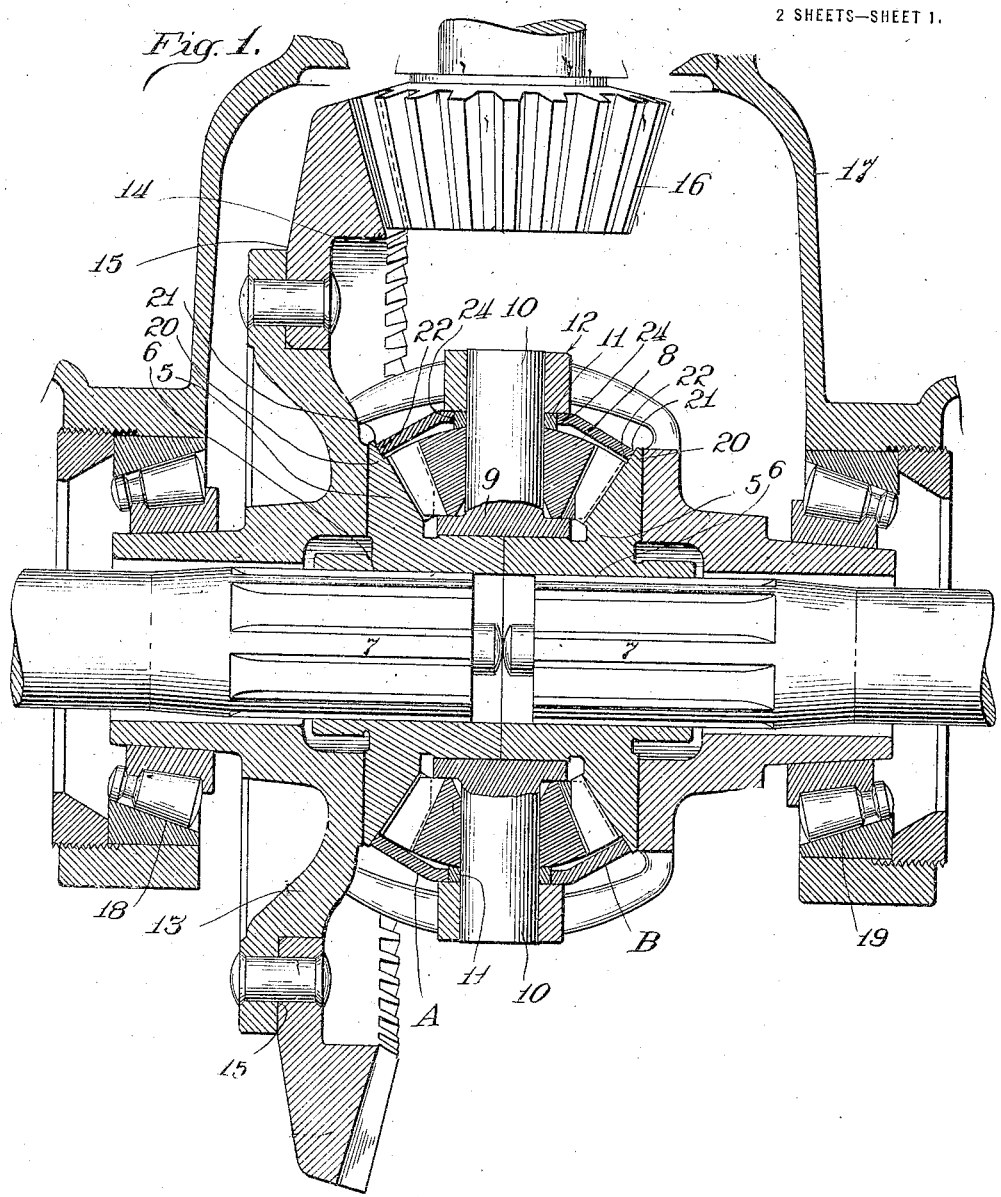
Figure 1 is a longitudinal horizontal section of a rear axle of an automobile with my improvement incorporated therewith.

One embodiment of my invention will now be described.

My improvement is assembled in a rear axle of a motor vehicle preferably with the ordinary bevel gear type of differential mechanism and shaft drive. It may be stated in the case of a chain drive a divided jack shaft with a rotatable housing for the differential mechanism is employed.

Referring to the drawings by numerals, 5 designates each of two bevel-gear wheels of equal diameters, with suitably formed shaft openings 6, and mounted on adjacent end portions 7 of the divided shaft, designed to be revolved, and bevel pinions 8 journaled radially between the two bevel gear wheels 5 and constantly in mesh with said gear wheels. The spider 9 is formed with radial trunnions 10, each having one of said pinions 8 loosely mounted thereon. Preferably an anti-friction ring 11 is mounted on each trunnion between the pinion and the rotatable housing or power imparting member 12, which is composed of two halves, one of which has an external annular flange 13 with the master gear 14 fixed thereto at 15. The bevel pinion 16 is in mesh with the gear 14. The non-rotatable housing 17 affords the usual bearings 18, 19, for the rotatable housing 12.

The bevel gear wheels 5 each preferably are formed with an external annular flange or brake surface 20 which has an annular inner friction face 21, thus providing a relatively large friction area for brake purposes. The separate annular brake members A and B preferably are made of cast steel and hardened but may be of any desired metal or substance. These brake members are alike in construction and a description of one is a description of both. Preferably each is cylindrical and tapering outwardly toward one end where there is formed an annular friction area 22 for frictional engagement with the annular friction face 21 of the bevel gears 5 with which it is in frictional contact. The inner end of each of the members A and B is somewhat greater in diameter than the outer end and is formed with as many inwardly extending interfering projections 23 as there are spider trunnions 10, thus providing elongated openings C in which the trunnions may limit travel relative to the brake members A and B. The end wall surface 24 of each brake member preferably is a snug fit against the outer face of the anti-friction ring 11, or if no friction ring is employed then against the trunnion or driver. It is apparent the degree of brake effort exerted between the friction surfaces or faces 21, 22, depends somewhat upon how tight the members A and B are put into place, and the extent of the friction surface. Also it is obvious that relatively there is a smaller degree of friction exerted between the wall surface 24 and the anti-friction ring 11 by either of the brake members A and B. In the event only two trunnions of the spider or driver are used, it will readily appear that the elongated opening C will be longer, and consequently the slipping vehicle wheel could spin nearly a half turn before being prevented by the brake member colliding with the trunnion or driver. The more trunnions on the spider the shorter distance the slipping vehicle wheel would move before being arrested.

As in common practice the free ends of the trunnions are disposed in recesses in the opposing surfaces of the two halves of the rotatable housing 12 and the two halves are suitably secured together by bolts or otherwise.

In construction and operation, the projections 23 are not able to interfere with each other in relative movement because any inward movement of either member A or B is limited by the trunnions or the anti-friction rings 11. The frictional contact of A or B with its bevel gear 5 will prevent spinning of the vehicle wheel attached to the shaft of the bevel gear wheel 5 beyond the distance permitted by the opening C. The members A and B are operated by the relative movement of the bevel gear wheels 5. The projections 23 cannot pass the trunnions 10 because they project into the path of travel of the trunnions. The opposing walls 24 are parallel with each other and normally throughout the length of the opening 6 the same degree of friction is exerted. The driving member comprises the spider and its trunnions and the rotatable housing. The brake members may be in contact with either or both as may be desired without departing from the spirit of my invention.

An important feature of my improvement is the provision of mechanism in constant contact with the bevel gears 5, 5, to oppose and prevent spinning of either driving vehicle wheel and to limit relative rotative movement of the two bevel gears 5. The brake member A is in contact on one side with the bevel gear wheel 5 and with the driver on the other side, the member B being in contact with its bevel gear wheel 5 on one side and with the driver on the other side.

I do not limit my invention to the construction shown and described when in the inner and opposing edges of the members A and B are made to contact with the trunnions 10 for the reason it will readily appear that bosses or recesses at intervals on or in the inner wall of each half of the rotatable housing 12 will serve the same purpose as the construction herein set forth.

In turning a corner the inner vehicle wheel and its bevel gear frequently are caused to have a movement rearwardly relative to the outside vehicle wheel and the brake member in contact with the inner bevel gear has a corresponding backward movement with its bevel gear relative to the driver.

It is desirable to provide for possible slippage between the friction faces of the brake members and the bevel gears before injury could be done by dragging to the tread surface of the tire of either vehicle drive wheel, for example when making a short turn of the car.

By thus showing and specifically describing one embodiment of my present invention I do not intend to restrict the range of equivalents not rendered necessary by the prior state of this art.

Having thus fully described my invention, what I claim as new, and desire to secure by Letters-Patent, is—

1. In brake mechanism for differentials, the combination with a divided shaft and differential gearing including a driver and bevel gears having annular brake surfaces connecting the adjacent ends of the divided shaft, of a plurality of annular brake members, having inwardly extending projections and in contact on one end with said driver and in contact on the other ends with said bevel gear respectively to limit relative rotative movement of said bevel gears.

2. In brake mechanism for differentials, the combination with a divided shaft and bevel gears having annular brake surfaces fixed to the adjacent ends of the divided shaft, and a driver, of a plurality of annular brake members having inwardly extending projections and in contact at one end with said driver and in contact on the other ends with said respective bevel gears to limit relative rotative movement of said bevel gears.

3. In brake mechanism for differentials, the combination with a divided shaft and bevel gears having annular brake surfaces fixed to the adjacent ends of the divided shaft and a spider, of a plurality of annular brake members having inwardly extending projections and in frictional contact at one end with said spider and in frictional contact on the other ends with said respective bevel gears.

4. In brake mechanism for differentials, the combination with a divided shaft and bevel gears having annular brake surfaces fixed to the adjacent ends of the divided shaft and a spider including radial trunnions carrying rotatably mounted bevel pinions in mesh with both of the bevel gears, of a plurality of annular brake members having inwardly extending projections and in frictional contact at one end with said trunnions and in frictional contact on the other ends with the respective bevel gears.

5. In brake mechanism for differentials, the combination with a divided shaft and bevel gears having annular brake surfaces fixed to the adjacent ends of the divided shaft and a spider including radial trunnions carrying rotatably mounted bevel pinions in mesh with both of said bevel gears and a rotatable housing in operative engagement with the trunnions, of a plurality of annular brake members having inwardly extending projections and in frictional contact at one end with said trunnions and in frictional contact on the other ends with said respective bevel gears.

6. In brake mechanism for differentials, the combination with a divided shaft and bevel gears having annular brake surfaces fixed to the adjacent ends of the divided shaft and a spider including radial trunnions carrying rotatably mounted bevel pinions in mesh with both of the bevel gears and anti-friction rings, of a plurality of annular brake members having inwardly extending projections and in frictional contact at one end with the anti-friction rings and in frictional contact on the other ends with said respective bevel gears.

7. In brake mechanism for differentials, the combination with a divided shaft and bevel gears having annular brake surfaces fixed to the adjacent ends of the divided shaft and a spider including radial trunnions carrying rotatably mounted bevel pinions in mesh with both of said bevel gears and a rotatable housing in operative engagement with the trunnions and anti-friction rings on the trunnions, of a plurality of annular brake members having inwardly extending projections and in frictional contact at one end with the anti-friction rings and in frictional contact at the other ends with said bevel gears respectively.

8. In brake mechanism for differentials, the combination with a plurality of bevel gears having annular brake surfaces and a driver disposed between the bevel gears, of a plurality of annular brake members formed with elongated openings therebetween to permit limited rotative movement of the driver with respect to the brake members.

9. In brake mechanism for differentials, the combination with a plurality of bevel gears having annular brake surfaces and a driver disposed between the bevel gears and carrying rotatably mounted bevel pinions in mesh with both of said bevel gears, of a plurality of annular brake members formed with elongated openings therebetween to permit limited rotative movement of the driver with respect to the brake members.

10. In brake mechanism for differentials, the combination with a divided shaft and bevel gears having annular brake surfaces fixed to the adjacent ends of the divided shaft and a spider including radial trunnions carrying rotatably mounted bevel pinions in mesh with both of the bevel gears, of a plurality of annular brake members formed with elongated openings therebetween to permit limited rotative movement of the spider with respect to the brake members.

11. In brake mechanism for differentials, the combination with a plurality of bevel gears each having an external annular flange with a brake surface thereon and a driver disposed between the bevel gears, of a plurality of annular brake members in contact with the bevel gear brake surfaces and the driver and formed with elongated openings therebetween to permit limited rotative movement of the driver with respect to the brake members.

12. In brake mechanism for differentials, the combination with a divided shaft and bevel gears each having an external annular flange formed with an annular brake surface thereon fixed to the adjacent ends of the divided shaft and a driver including trunnions carrying rotatably mounted bevel pinions in mesh with both of said bevel gears, of a plurality of annular brake members in contact with the bevel gear brake surfaces and the driver and formed with elongated openings therebetween to permit limited rotative movement of the driver with respect to the brake members.

13. In brake mechanism for differentials, the combination with a divided shaft and bevel gears each having an external annular flange formed with a brake surface thereon fixed to the adjacent ends of the divided shaft and a driver including radial trunnions carrying rotatably mounted bevel pinions in mesh with both of the bevel gears and anti-friction rings, of a plurality of annular brake members in contact with the bevel gear brake surfaces and the driver and formed with elongated openings therebetween to permit limited rotative movement of the driver with respect to the brake members.

14. In brake mechanism for differentials of the class described, the combination with a divided shaft and differential gearing including a driver connecting the adjacent ends of the divided shaft, of a plurality of annular brake members disposed between the gears on the adjacent ends of the divided shaft and the driver and formed with elongated openings between said brake members to oppose and limit relative rotative movement of the driven members in either direction.

In testimony whereof I affix my signature in the presence of a witness.

CLARENCE W. TAYLOR.

Witness:
SCOTT M. HOGAN.